United States Patent
Baumann

(10) Patent No.: US 7,893,358 B2
(45) Date of Patent: Feb. 22, 2011

(54) CONDUCTOR BAR FOR THE STATOR OF A GENERATOR, AND METHOD FOR ITS PRODUCTION

(75) Inventor: Thomas Baumann, Wettingen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/502,350

(22) Filed: Jul. 14, 2009

(65) Prior Publication Data

US 2010/0007226 A1      Jan. 14, 2010

Related U.S. Application Data

(63) Continuation of application No. PCT/EP2008/050249, filed on Jan. 10, 2008.

(30) Foreign Application Priority Data

Jan. 18, 2007     (CH) .................................. 00067/07

(51) Int. Cl.
    *H01B 17/54*    (2006.01)
(52) U.S. Cl. ................. 174/120 R; 174/137 B
(58) Field of Classification Search ............ 174/120 R, 174/137 B; 310/45, 215
    See application file for complete search history.

(56) References Cited

U.S. PATENT DOCUMENTS

| | | | | |
|---|---|---|---|---|
| 4,865,905 A | * | 9/1989 | Uken | ............................ 428/220 |
| 5,540,969 A | * | 7/1996 | Schuler | ........................ 442/212 |
| 5,723,920 A | * | 3/1998 | Markovitz et al. | ............. 310/45 |
| 6,043,582 A | * | 3/2000 | Markovitz et al. | ........... 310/213 |
| 6,140,590 A | * | 10/2000 | Baumann et al. | ......... 174/137 B |
| 6,288,341 B1 | | 9/2001 | Tsunoda et al. | |
| 6,404,092 B1 | | 6/2002 | Baumann et al. | |
| 6,504,102 B2 | * | 1/2003 | Tsunoda et al. | .......... 174/137 B |
| 2001/0045687 A1 | | 11/2001 | Baumann et al. | |

FOREIGN PATENT DOCUMENTS

| | | |
|---|---|---|
| DE | 2004228 A1 | 8/1971 |
| DE | 2320828 A1 | 11/1974 |
| DE | 19536209 A1 | 12/1996 |
| DE | 19817287 A1 | 10/1999 |
| DE | 19860412 A1 | 6/2000 |
| EP | 1154542 A1 | 11/2001 |
| GB | 2406721 A | 4/2005 |
| WO | WO 9727661 A1 | 7/1997 |

OTHER PUBLICATIONS

Sequenz, Herstellung von Wicklungen electrischer Maschinen [production of windings of electrical machines] Springer Verlag 1973, pp. 150-154.

* cited by examiner

*Primary Examiner*—Chau N Nguyen
(74) *Attorney, Agent, or Firm*—Leydig, Voit & Mayer, Ltd.

(57) ABSTRACT

A conductor bar for a stator of a generator includes a plurality of internal conductor elements; an insulation wound around the plurality of internal conductor elements so as to externally enclose the plurality of internal conductor elements, the insulation including impregnated glass/mica bands; and at least one interlayer disposed between the insulation and the plurality of internal conductor elements so as to improve a mechanical connection between the plurality of internal conductor elements and the insulation.

19 Claims, 5 Drawing Sheets

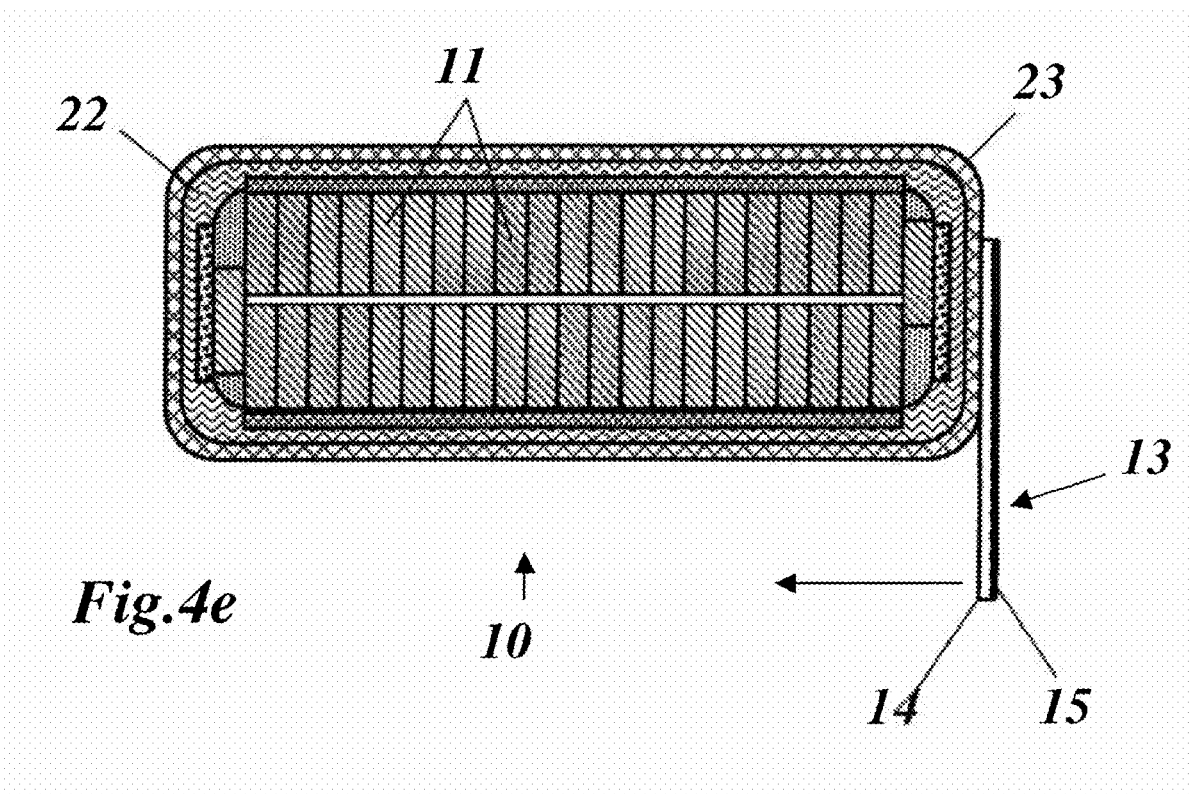

CONDUCTOR BAR FOR THE STATOR OF A GENERATOR, AND METHOD FOR ITS PRODUCTION

This application is a continuation of International Patent Application No. PCT/EP2008/050249, filed on Jan. 10, 2008, which claims priority to Swiss Patent Application No. CH 00067/07, filed on Jan. 18, 2007. The entire disclosure of both applications is incorporated by reference herein.

The present invention concerns the field of rotating electrical machines. It relates to a conductor bar for the stator of a generator, and to a method for producing such a conductor bar.

BACKGROUND

Known conductor bars in the stators of generators have in cross section an internal structure as depicted in FIG. 1 (see also Document DE 19817287). A conductor bar 10 contains a multiplicity of conductor elements 11, which are enclosed by insulation 12. The insulation consists of glass/mica bands, which are wound around and impregnated by a so-called vacuum-pressure method (see also H Sequenz: "Herstellung von Wicklungen electrischer Maschinen" [production of windings of electrical machines] Springer Verlag 1973, pp. 150-154). In the glass/mica bands (13 in FIG. 2), the mica is provided as so-called mica paper 14 which is applied onto a glass filament fabric or glass fabric 15 in order to improve the mechanical strength. Mica is a mineral which belongs to the group of sheet silicates. This sheet-like atomic structure causes mica crystals to have macroscopic shapes which are also very much like platelets.

The mica paper 14 consists of a multiplicity of platelets stacked on and above one another, all of which essentially lie in a plane. The glass/mica bands 13 are wound axially onto the conductor bar in a plurality of layers so that they overlap. Since the electric field is predominantly radial with respect to the bar axis, the platelets are oriented perpendicularly to the field direction. Mica platelets have a very high dielectric strength in this direction, which is then imparted to the insulation as a whole owing to the parallel alignment of the platelets.

That which promotes the dielectric strength, however, is detrimental to the mechanical strength—especially the thermal and mechanical strength: the insulation has a different thermal expansion coefficient to the Cu bar, with the conductor elements 11, which it encloses, so that thermal stresses between the Cu and the insulation 12 are unavoidably formed during thermal cycles. These are greatest in or in the vicinity of the boundary layer. If the band is then wound so that the mica side faces toward the band (which would be favorable in terms of winding technology and for electrical reasons), this can easily lead to mechanical shearing with the first mica layer usually remaining attached to the Cu.

The shearing produces sizeable cavities, which are detrimental for two reasons:

they reduce the thermal conduction radially with respect to the bar direction;
undesired partial discharges are ignited in them.

As a simple countermeasure to suppress the cavities, the first layer is often wound with the glass facing downward, and the second and subsequent layers with the mica facing downward.

In this case, however, two problems arise:

when winding "with the mica outward", the mica paper 14 is bent sharply over the edges and usually breaks. At least some of the mica platelets therefore lose their alignment, which weakens the dielectric strength.

Between the $1^{st}$ and $2^{nd}$ layers, 2 mica layers lie directly on one another, and it is often observed that the insulation then tears between the $1^{st}$ and $2^{nd}$ layers, or in the mica of the $1^{st}$ layer, instead of near the interface between the Cu and the $1^{st}$ layer.

A very different approach employs the following measure:

a layer of mica paper is initially wound on the (uncured) green bar with the mica side toward the bar.

A layer of conductive band is wound over this, and is electrically connected to the green bar in the vicinity of the lug holes. Only then is the main insulation applied with the desired thickness. If disbanding now takes place, this will be very likely to occur in the first mica layer directly on the bar. Since this cavity has a floating potential, owing to the conductor band lying above it, partial discharges are prevented.

This measure, however, does not help to prevent degradation of the thermal conduction. Added to this, another disadvantage is that the additional layer of mica and the conductor band increase the total thickness of the insulation (0.3-0.5 mm on each side).

SUMMARY OF THE INVENTION

An aspect of the invention is to provide a conductor bar in which the mechanical connection between the bar and the insulation is improved, the dielectric strength being preserved or even improved, and to present a method for its production.

An aspect of the invention is that, in order to improve the mechanical connection between the conductor elements and the insulation, at least one interlayer is provided between the insulation and the conductor elements.

One configuration of the invention is characterized in that the interlayer comprises a nonwoven, which preferably consists of glass fibers or thermoplastic synthetic fibers, in particular made of PET, or of carbon fibers, or a mixed nonwoven thereof, in particular carbon fibers and thermoplastic synthetic fibers or carbon and glass fibers.

The nonwoven may in particular be applied onto a glass/mica band and thus be part of a three-layer band, which at the same time forms the first layer of the insulation.

If the conductor bar has a straight section, the three-layer band will be wound around the conductor elements at least in the straight section, the three-layer band preferably being wound flush in the straight section of the conductor bar.

Another configuration of the invention is distinguished in that the interlayer consists of a layer sequence of conductive polyester nonwoven and a fabric band placed thereon.

If the conductor bar has a straight section, a band of conductive polyester nonwoven will be wound around the conductor elements at least in the straight section.

The polyester nonwoven will in particular be wound in one layer spirally, and preferably flush, around the conductor elements.

It is, however, also conceivable for a web of conductive polyester nonwoven to be wound flush around the conductor elements with the longitudinal axis parallel to the longitudinal axis of the conductor bar, so as to create a gap extending in the axial direction between the adjacent longitudinal edges of the web.

Preferably, the conductor bar has an essentially rectangular cross section with narrow sides and wide sides and the conductive polyester nonwoven is adhesively bonded to the conductor elements on the narrow sides by means of a conductive resin.

The conductive polyester nonwoven may furthermore be adhesively bonded to the conductor elements by means of a thermosetting silicone elastomer on the wide sides of the conductor bar.

It is, however, also conceivable for the conductive polyester nonwoven to be separated from the conductor elements by a separator on the wide sides of the conductor bar.

One configuration of the method according to the invention is characterized in that a nonwoven is applied as the interlayer, and in that a three-layer band containing the nonwoven is wound around the green bar in order to apply the nonwoven.

Another possibility consists in initially winding a band or a web of conductive polyester nonwoven around the green bar in order to form the interlayer, and in winding a layer of a separating and absorbing fabric band over the nonwoven.

If the conductor bar has an essentially rectangular cross section with narrow sides and wide sides, then the green bar will preferably be coated with a conductive resin on the narrow sides before the nonwoven is applied, in order to bind the nonwoven.

A thermosetting silicone elastomer may furthermore be applied onto the wide sides of the green bar before the nonwoven is applied, or a separator is applied onto the wide sides of the green bar before the nonwoven is applied.

BRIEF DESCRIPTION OF THE FIGURES

The invention will be explained in more detail below with the aid of exemplary embodiments in conjunction with the drawing, in which.

DETAILED DESCRIPTION

Figure 1:
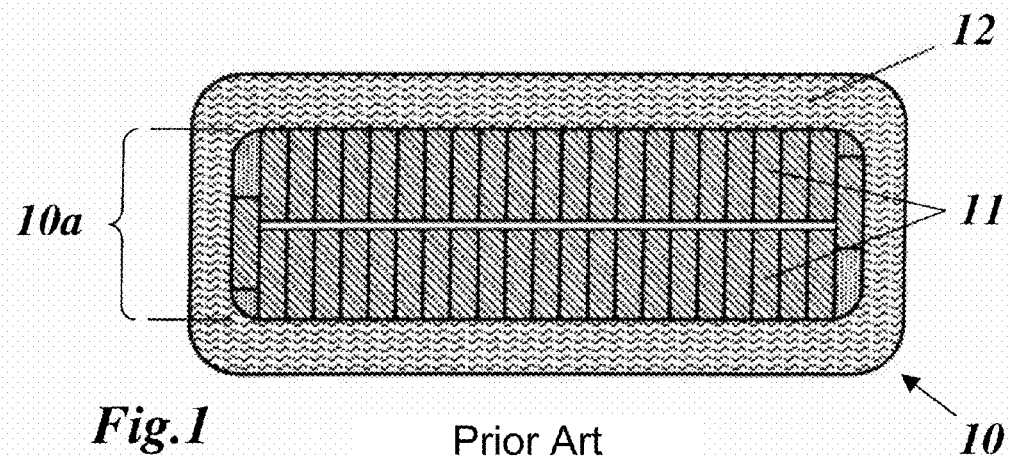
FIG. 1 shows a simplified cross section through a known conductor bar, with internal conductor elements and insulation externally enclosing the conductor elements.
Figure 2:
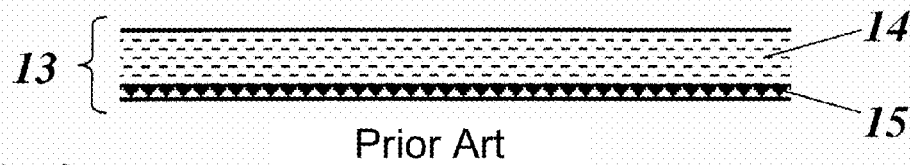
FIG. 2 shows the simplified cross section (not true to scale) through a glass/mica band as is used to construct the insulation of a conductor bar according to FIG. 1.
Figure 3:
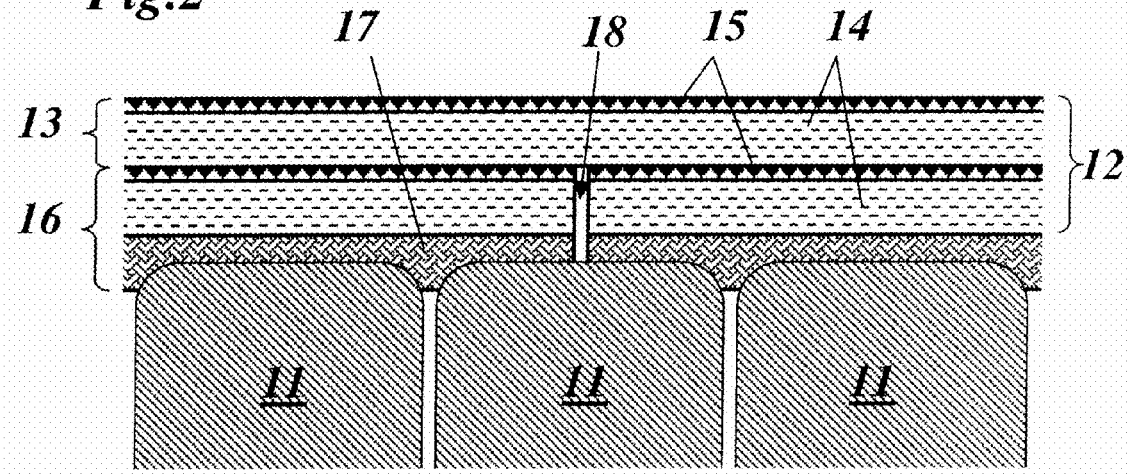
FIG. 3 shows a detail of the cross section through a conductor bar according to a first exemplary embodiment of the invention, with an interlayer made of nonwoven.

A detail of the cross section through a conductor bar according to a first exemplary embodiment of the invention is depicted in FIG. 3. On the conductor bar 10 of FIG. 3, a thin layer of a nonwoven 17 is wound as the first layer instead of a glass/mica band 13. This nonwoven 17 may consist of either glass fibers or thermoplastic synthetic fibers (for example PET) or carbon fibers. In a preferred embodiment, the nonwoven 17 is applied as the lowermost layer onto a glass/mica band with the arrangement nonwoven/mica/glass (from the inside outward). Such three-layer bands 16 comprising PET nonwoven are commercially available and are currently used for the manual reinsulation of connection points.

The use of such three-layer bands 16 comprising PET nonwoven is known from the so-called "resin-rich" technique. In this case, the entire conductor bar is wound with triple bands. Disadvantages are on the one hand that the PET nonwoven layer has poor thermal conduction, and on the other hand that the total proportion of mica in the insulation is reduced, which is unfavorable for the dielectric strength.

In the configuration according to FIG. 3, only the first layer is applied with a three-layer band 16; winding is then carried out using a conventional glass/mica band 13 with the glass fabric 15 placed outward—as is customary. The insulation is compressed before or after the impregnation. The nonwoven 17 is thereby partially pressed into the gaps between the conductor elements 11 (see FIG. 3). After the bar has been cured, this structure forms an effective force fit between the bar and the insulation. Furthermore, thermoplastics have a very good extensibility so that the structure (especially at elevated temperatures) can naturally absorb any thermomechanical stresses still existing. A comparable effect is also achieved by carbon fiber nonwoven or carbon fiber/PET mixed nonwoven.

This first layer with the three-layer band 16 may be wound either over the entire bar or only over the straight part or section of the bar, when there are the greatest dielectric stress and thermomechanical stress due to tangential forces.

In a preferred embodiment, the $1^{st}$ layer is wound flush instead of overlapping at least in the straight part (see the flush fit 18 in FIG. 3). The thickness of the layer is thus reduced (which is favorable for the thermal conduction) and the first layer of mica (14) is as parallel as possible to the surface of the bar (if the winding overlaps, there will always be positions where the mica orientation also has radial components).

Other configurations of the invention may be explained with the aid of FIGS. 4, 5 and 6, each of these figures depicting various steps in the production of the conductor bar.

Figure 4A:
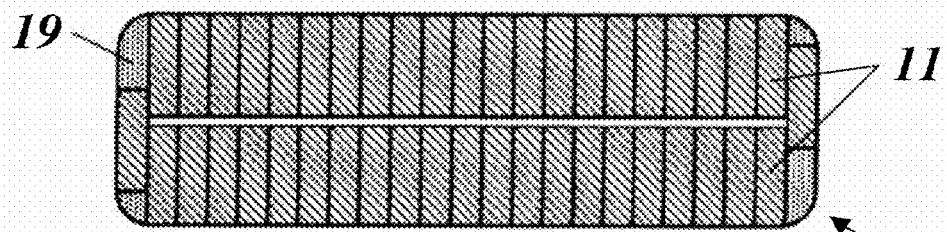
FIG. 4 shows various steps in the production of a conductor bar according to a second exemplary embodiment of the invention, in a plurality of sub-figures (FIGS. 4a-e)

The method according to FIG. 4 is based on a green bar 10a which has a rectangular cross section and comprises a multiplicity of conductor elements 11, and whose end faces are filled with conductive cement 19 (FIG. 4a). As recited herein, a rectangular cross section is a cross section having an essentially rectangular shape.

Figure 4B:
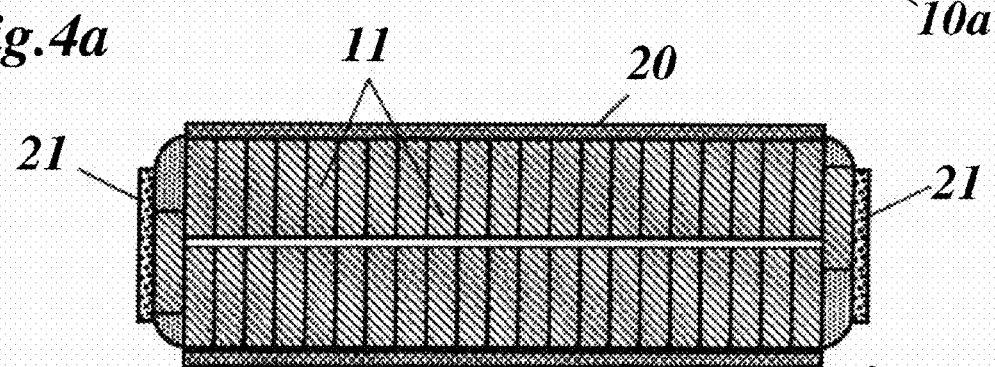

A thermosetting silicone elastomer 20 is applied onto the wide sides of the uncompacted green bar 10a. The narrow sides of the green bar 10a are not coated with the silicone elastomer 20. In order to ensure one hundred percent binding of the conductive nonwoven with which it is subsequently wound, the narrow sides may be coated with a conductive resin 21 (FIG. 4b). For the sake of clarity, the applied layers are represented with an exaggerated thickness in FIG. 4.

Figure 4C:
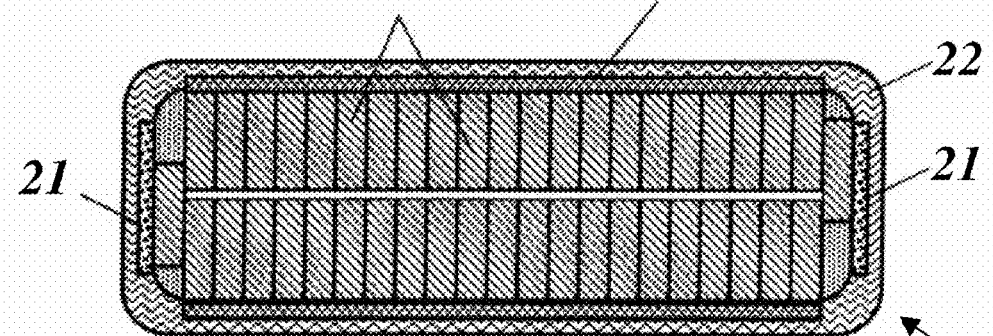

Over the green bar 10a prepared in this way, a conductive band of polyester nonwoven 22 is wound in one layer spirally (FIG. 4c). The winding should preferably be carried out flush (i.e. without overlap).

Figure 4D:
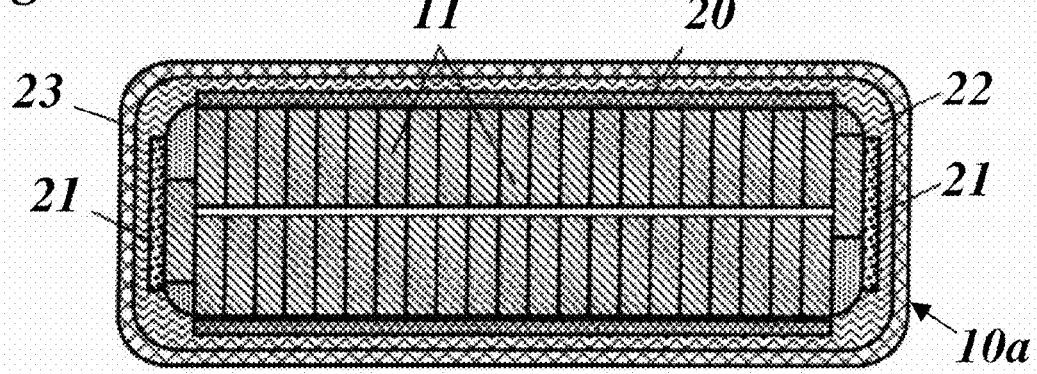

A layer of a fabric band 23 is then wound over this as a separating and absorber band (FIG. 4d). The bar is subsequently compacted in the conventional way in a hot press. The conductive polyester nonwoven 22 is thereby also adhesively bonded to the bar; excess silicone elastomer 20 is squeezed out and absorbed by the fabric band 23. The layer of adhesively bonded conductive nonwoven (22) may extend either over the entire bar or (preferably) only over the straight part (section).

After compaction, the conductor bar 10 is insulated and impregnated as usual with glass/mica band 13 (glass fabric 15 upward for all layers) in the conventional way (FIG. 4e).

Conductive PES nonwovens with a thickness of 0.1 mm are commercially available and are used for the so-called "round packing" of bars. These bands may be used either with their original width (typically 100 mm) or narrower. Also commercially available are thin carbon fiber nonwovens with a thickness of down to 30 μm. By the pressing process, the silicone elastomer 20 is pressed to zero thickness on the end faces of the conductor elements 11. The connection between the bar and the conductive nonwoven (22) is provided by the silicone elastomer 20 remaining in the gaps between the conductor elements 11. The effect achieved by this is that the additional thickness is reduced merely to the thickness of the conductive nonwoven (22), i.e. for example 0.1 mm. In contrast to adhesive bonding with epoxy, the silicone elastomer 20 is capable of absorbing mechanical stresses without tearing. This achieves improved connection of the insulation to the bar and reduces the risk of cavitation. If separation from the bar nevertheless take place in the silicone elastomer layer, there is still the advantage that this cavity will have a floating potential and be therefore free from partial discharges.

A variant of the method shown in FIG. 4 is represented in FIG. 5, parts which are the same being provided with the same references. The method according to FIG. 5 is carried out similarly as that in FIG. 4, except that large webs of conductive nonwoven are wound around the straight part of the bar, instead of a spirally wound band of conductive polyester nonwoven 22. The length of the web corresponds to the length of the straight part (section) of the bar, and the width of the web corresponds to the bar circumference or (preferably) is somewhat smaller.

Figure 5A:
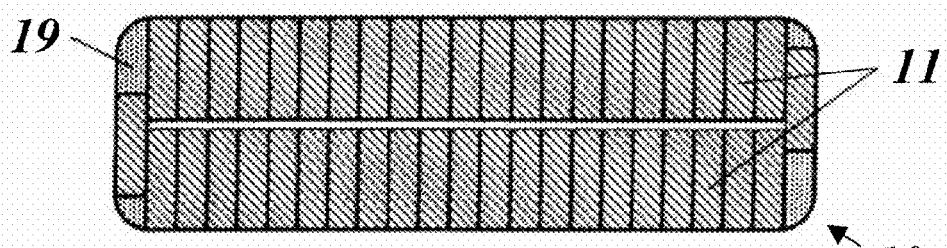
FIG. 5 shows various steps in the production of a conductor bar according to a third exemplary embodiment of the invention, in a plurality of sub-figures (FIGS. 5a-d)
Figure 5B:
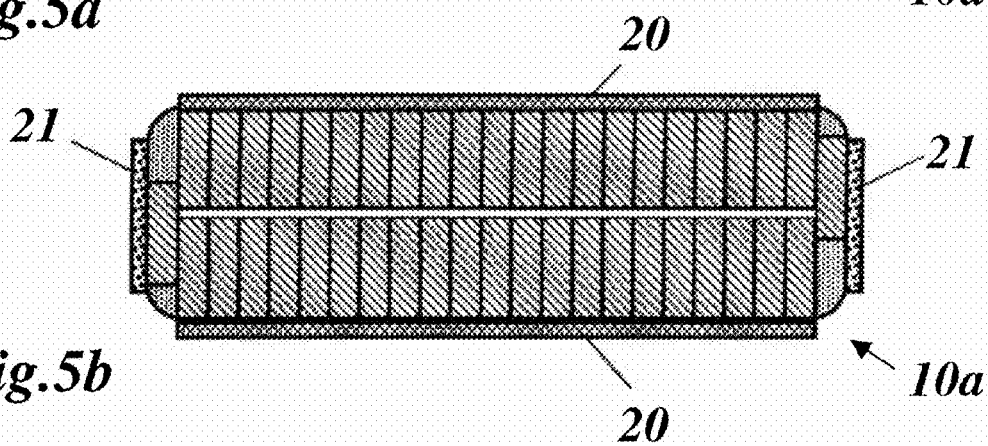
Figure 5C:
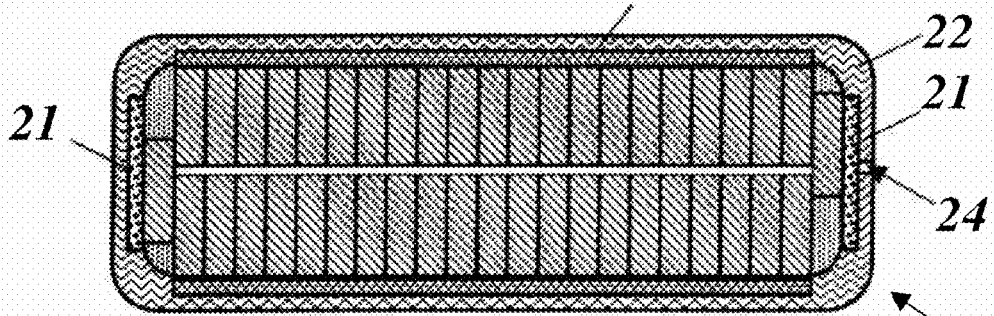
Figure 5D:
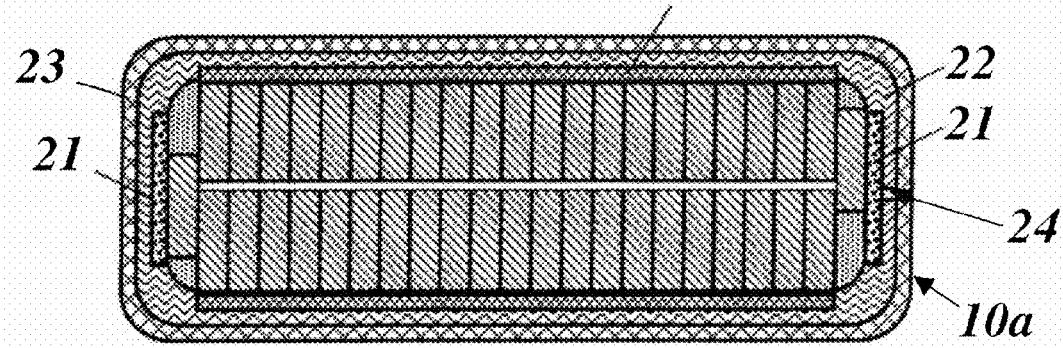
Figure 6A:
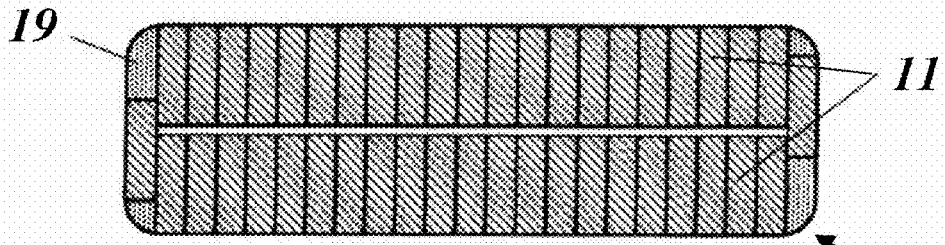
FIG. 6 shows various steps in the production of a conductor bar according to a fourth exemplary embodiment of the invention, in a plurality of sub-figures (FIGS. 6a-d)
Figure 6B:
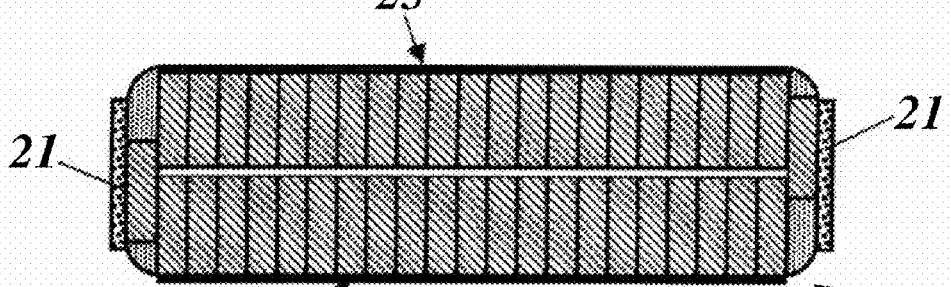
Figure 6C:
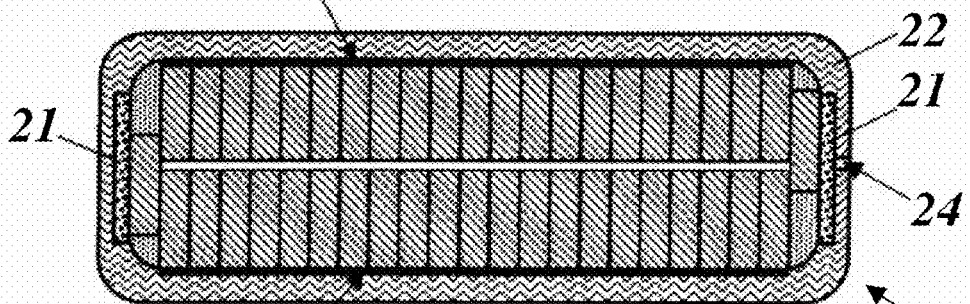
Figure 6D:
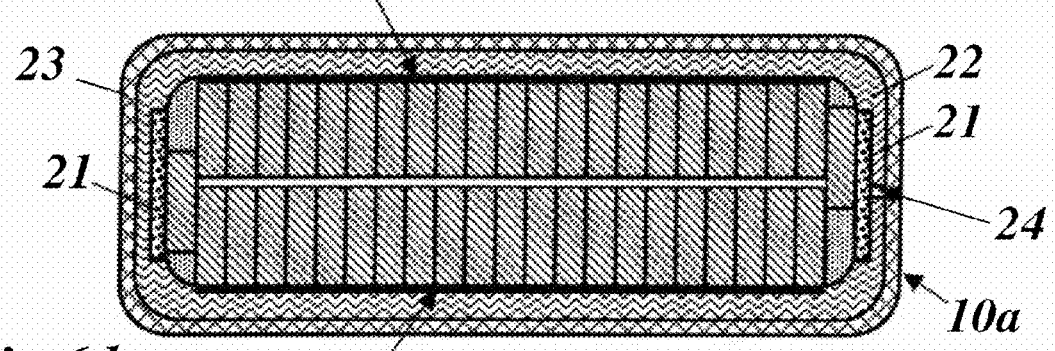

This creates a narrow gap 24 in the axial direction (FIGS. 5c and 5d), through which the excess resin 21 can escape. The web is preferably wound so that the gap lies on one of the two narrow sides, as indicated in FIGS. 5c and 5d. Instead of a single web with the full length L of the straight part, it is also possible to use n webs with a length of L/n. The other steps in this method are the same as in FIG. 4. The representation of the final winding process with the glass/mica band 13, corresponding to FIG. 4e, has been omitted to save space.

Another variant of the method shown in FIG. 4 is represented in FIG. 6, parts which are the same again being provided with the same references. For this variant, the green bar 10a may be uncompacted or already compacted. Adhesive bonding between the conductive nonwoven 22 and the green bar 10a is carried out only via the narrow sides (again with conductive resin 21).

The wide sides of the green bar 10a either remain dry or are even treated with a separator 25 (for example PTFE spray, or paste). The winding with the conductive nonwoven 22 is carried out as in FIG. 4 or 5. This reliably ensures that any cavity being formed will have a floating potential. The other steps are also carried out similarly as FIG. 4 or 5. In contrast to the prior art, in which the first layer of glass/mica band acts as a sacrificial break point, this variant has the advantage that it is much less thick (only an increase of 0.1-0.2 mm in the total insulation thickness).

LIST OF REFERENCES 10 conductor bar
10a green bar
11 conductor elements
12 insulation
13 glass/mica band
14 mica paper
15 glass fabric
16 three-layer band
17 nonwoven
18 flush fit
19 cement
20 silicone elastomer
21 conductive resin
22 polyester nonwoven (conductive)
23 fabric band
24 gap (axial)
25 separator

What is claimed is:

1. A conductor bar for a stator of a generator comprising:
a plurality of internal conductor elements;
an insulation wound around the plurality of internal conductor elements so as to externally enclose the plurality of internal conductor elements, the insulation including impregnated glass/mica bands; and
at least one interlayer disposed between the insulation and the plurality of internal conductor elements so as to improve a mechanical connection between the plurality of internal conductor elements and the insulation, wherein the interlayer includes a layer sequence of conductive polyester nonwoven and a fabric band, and wherein the conductor bar includes a rectangular cross section having at least one narrow side and at least one wide side and wherein a conductive resin adhesively bonds the conductive polyester nonwoven to the plurality of internal conductor elements on the at least one narrow side.

2. The conductor bar as recited in claim 1, wherein the at least one interlayer includes a nonwoven.

3. The conductor bar as recited in claim 2, wherein the nonwoven includes glass fibers.

4. The conductor bar as recited in claim 2, wherein the nonwoven includes thermoplastic synthetic fibers.

5. The conductor bar as recited in claim 2, wherein the nonwoven includes carbon fibers.

6. The conductor bar as recited in claim 2, wherein the nonwoven includes a fabric having fibers made of at least two different materials.

7. The conductor bar as recited in claim 2, wherein the nonwoven is disposed on the glass/mica band so as to form a three-layer band as a first insulation layer.

8. The conductor bar as recited in claim 7, wherein the conductor bar has a straight section and the three-layer band wound around the plurality of conductor elements at least in the straight section.

9. The conductor bar as recited in claim 8, wherein the three-layer band is wound flush in the straight section of the conductor bar.

10. The conductor bar as recited in claim 1, wherein the conductor bar has a straight section and a band of conductive polyester nonwoven wound around the plurality of internal conductor elements at least in the straight section.

11. The conductor bar as recited in claim 10, wherein the band of conductive polyester nonwoven is spirally wound in one layer around the plurality of internal conductor elements.

12. The conductor bar as recited in claim 10, wherein the band of conductive polyester nonwoven is wound flush around the plurality of conductor elements so as to define a first longitudinal axis parallel to a second longitudinal axis of the conductor bar and forms a gap extending in an axial direction between the adjacent longitudinal edges of the band.

13. The conductor bar as recited in claim 1, wherein a thermosetting silicone elastomer adhesively bonds the conductive polyester nonwoven to the plurality of internal conductor elements on the at least one wide side.

14. The conductor bar as recited in claim 1, further comprising a separator disposed on the at least one wide side and separating the conductive polyester nonwoven from the plurality of internal conductor elements.

15. A method for producing a conductor bar comprising:
applying at least one interlayer onto a green bar, the green bar including a plurality of internal conductor elements, wherein the applying includes winding one of a band and a web of conductive polyester nonwoven around the green bar and winding a layer of separating and absorbing fabric band over the polyester nonwoven;
winding a glass/mica band around the green bar so as to form an arrangement;
impregnating and curing the arrangement, wherein the conductor bar includes a rectangular cross section having at least one narrow side and at least one wide side; and
coating the green bar on the at least one narrow side before the winding of the polyester nonwoven step so as to bind the polyester nonwoven.

16. The method as recited in claim 15, wherein the at least one interlayer includes a nonwoven, and the applying the nonwoven includes winding a three-layer band containing the nonwoven around the green bar.

17. The method as recited in claim 15, further comprising applying a thermosetting silicone elastomer onto the at least one wide side before the winding of the polyester nonwoven step.

18. The method as recited in claim 15, further comprising applying a separator onto the at least one wide side before the winding of the polyester nonwoven step.

19. A conductor bar for a stator of a generator comprising:
a plurality of internal conductor elements, wherein the conductor bar has a straight section and a band of conductive polyester nonwoven wound around the plurality of internal conductor elements at least in the straight section;
an insulation wound around the plurality of internal conductor elements so as to externally enclose the plurality of internal conductor elements, the insulation including impregnated glass/mica bands; and
at least one interlayer disposed between the insulation and the plurality of internal conductor elements so as to improve a mechanical connection between the plurality of internal conductor elements and the insulation, wherein the interlayer includes a layer sequence of conductive polyester nonwoven and a fabric band, and wherein the band of conductive polyester nonwoven is wound flush around the plurality of conductor elements so as to define a first longitudinal axis parallel to a second longitudinal axis of the conductor bar and forms a gap extending in an axial direction between the adjacent longitudinal edges of the band.

* * * * *